July 21, 1970  W. R. GERCHOW ET AL  3,521,444
HYDRAULIC AND MECHANICAL WAY OR SADDLE TYPE TOOL SYSTEMS
Filed Aug. 26, 1968  3 Sheets-Sheet 2

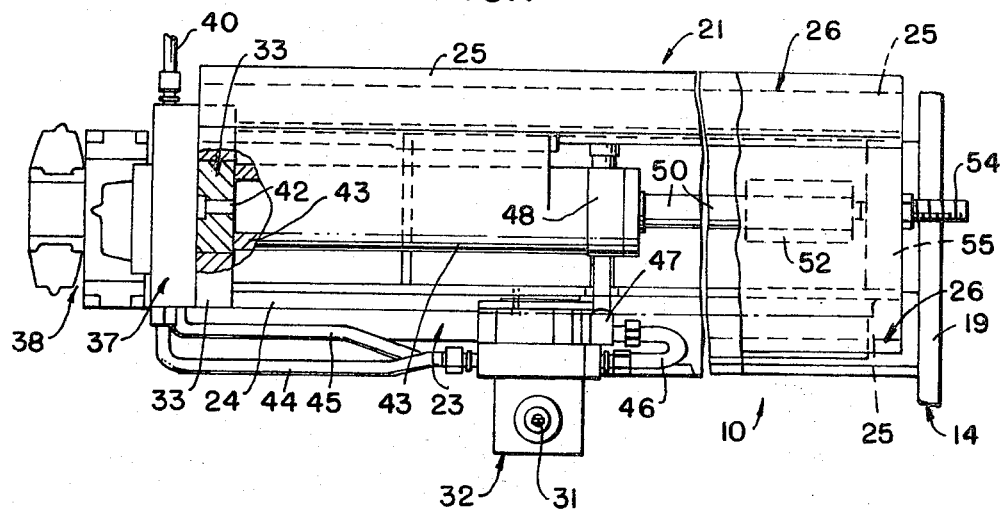
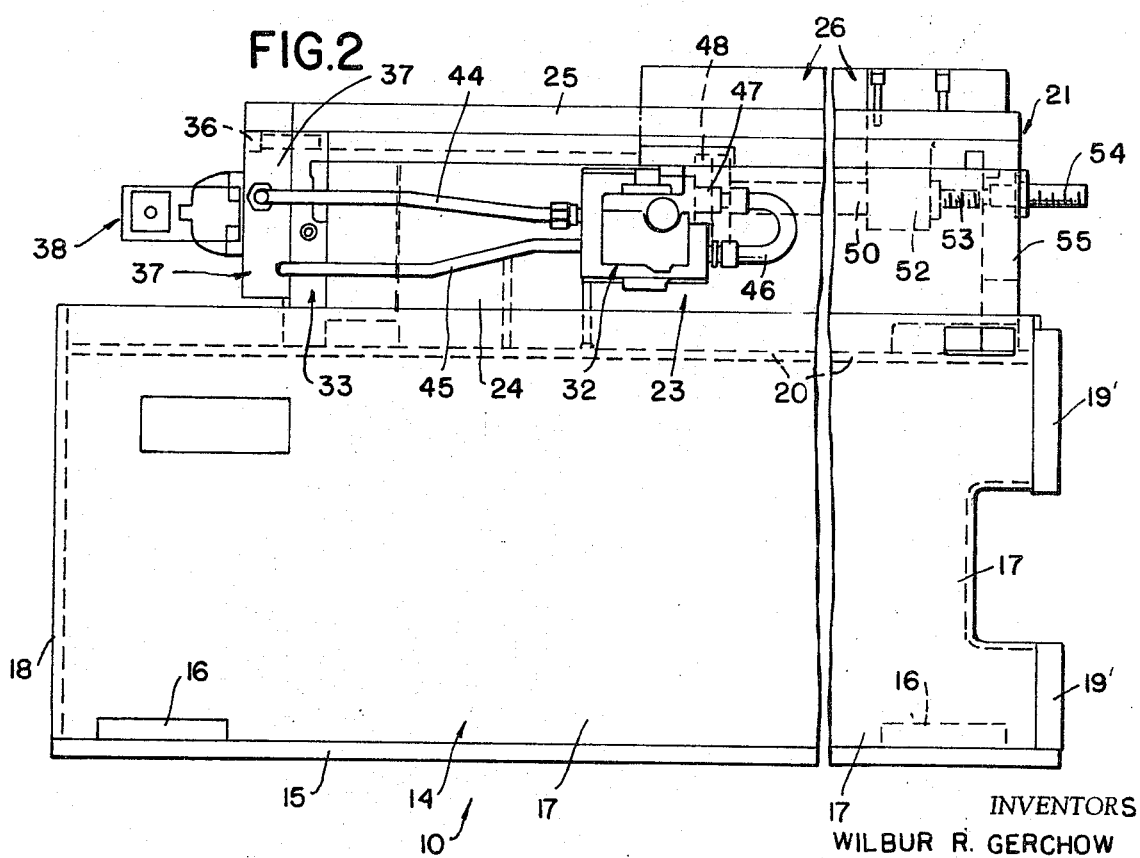

INVENTORS
WILBUR R. GERCHOW
MICHAEL ZAJAC
BY
ATTORNEYS

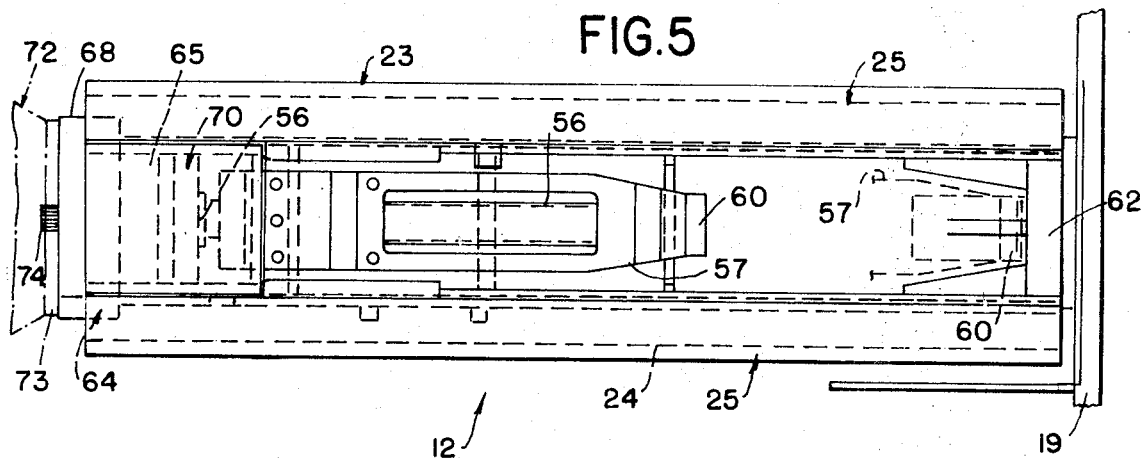
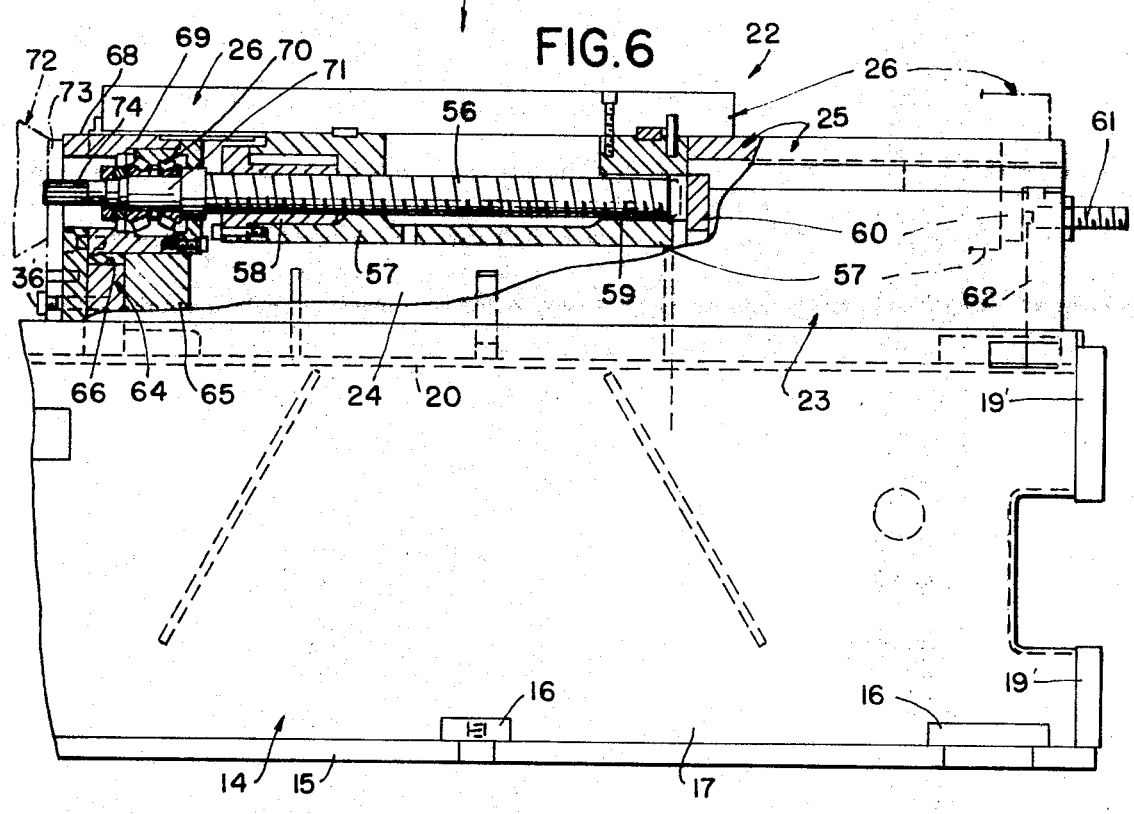
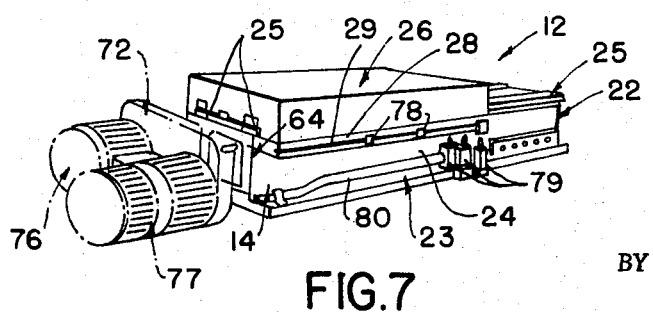

United States Patent Office 3,521,444
Patented July 21, 1970

3,521,444
HYDRAULIC AND MECHANICAL WAY OR SADDLE TYPE TOOL SYSTEMS
Wilbur R. Gerchow, Ann Arbor, and Michael Zajac, Dearborn Heights, Mich., assignors, by mesne assignments, to Buhr Machine Tool Corporation, a corporation of Delaware
Filed Aug. 26, 1968, Ser. No. 755,409
Int. Cl. F01b 23/00
U.S. Cl. 60—6                                      14 Claims

ABSTRACT OF THE DISCLOSURE

The systems feature a supporting structure for an actuator which moves a sliding way—or saddle-carried machine tool axially, the actuator being hydraulically or electrically powered. Such actuator, whether of one type or the other, is mounted by substantially identical means in either case upon a base designed to accommodate both the fluid and the electrically powered units. In the case of the hydraulically operated system, the flow of power liquid is through an assembly of manifold and reversing valve located "piggy-back" relative to one another and to an end of the hydraulic cylinder, in a manner to minimize external hydraulic connections.

CROSS REFERENCE TO RELATED APPLICATION

The co-pending application of Herman Farmer, Ser. No. 694,998, filed Jan. 2, 1968 and of common ownership, discloses dual feed and traverse motor powered mechanical way, platen or saddle units incorporating a planetary-type speed reducer, which drops the speed of stroke of the tool-carrying way or saddle at the commencement of the feed-in phase. Such reducer, or equivalent torque transmitting means, is contemplated for incorporation in the motorized version of the present equipment; however, it is not illustrated herein in the detailed manner of the Farmer application.

BACKGROUND OF THE INVENTION

Field of the invention

The invention relates to that branch of the machine tool industry which deals with the high precision tool working of castings, forgings and the like, usually in a mass production type, so-called transfer system. In such a system, successively acting rotary tool heads operate on workpieces indexed step-by-step therepast, the heads being electric motor-powered or hydraulically powered for variable speed working and retracting strokes transversely of the direction of workpiece indexing motion. However, it is obvious that the improvements of the invention are well adapted for the standardization to a considerable and valuable extent of individual mounts for machine tools of different make or design, and not necessarily as combined in transfer equipment.

Description of the prior art

The patents to Granberg et al. No. 2,519,042 of Aug. 15, 1950, Hermann No. 2,530,880 of Nov. 21, 1950, Havener No. 2,578,546 of Dec. 11, 1951, Estabrook No. 2,781,616 of Feb. 19, 1957, Goldring No. 2,976,582 of Mar. 28, 1961, Carlstedt No. 3,083,592 of Apr. 2, 1963, and Zajac No. 2,955,577 of Oct. 11, 1960, relate, in the most part in the most general way to electric motor and hydraulic cylinder-powered way or like machine tools of the type herein involved. The Zajac patent, of common ownership herewith, shows a saddle speed controlling valve unit similar to the one employed in the hydraulic version of the present disclosure.

We are unaware of any prior art patents relating to the selective mounting of such motor or fluid pressure powered units, on single basic structure of common design, utilizing generally similar adapter plate components for the purpose.

SUMMARY OF THE INVENTION

It is increasingly imperative in modern machine tool installations, particularly in installations of the multiple tool head, transfer type mentioned above, that they be functionally flexible in all possible respects. One approach to the obtaining of this general objective involves a recognition of the desirability to selectively employ electric motor or hydraulic power drive for any or all of the multiple machine tools of a given installation. Yet this should involve a minimum of change-over "down" time, a minimum of initial set-up time, no need to stock multiple types of stationary equipment for various types and/or makes of machine tool, a minimum of maintenance service, etc.

To these ends, the present invention makes it possible to mount on a single design of base structure of ample rigidity and strength, with a minimum time and effort in respect to initial installation of re-setting, a machine tool platen, way or saddle unit which is powered either electro-mechanically or hydraulically.

In the case of a hydraulic cylinder-powered unit the installation is improved in point of simplicity and cost, both initial and in maintenance, by utilizing a "piggy-back" mounted reversing valve and manifold device at an end of the power cylinder. This reduces considerably the amount of external hydraulic circuitry required.

BRIEF DESCRIPTION OF THE DRAWINGS

FIG. 1 is a fragmentary top plan view, partially broken away and in horizontal section, of a hydraulic cylinder-powered version of a tool supporting way, saddle or platen assembly pursuant to the present invention;

FIG. 2 is a view in side elevation, also partially broken away, of a part of the assembly of FIG. 1;

FIG. 5 is a top plan view of the equipment of FIG. 4, but with the platen or saddle removed;

FIG. 6 is a side elevation, partially broken away and in vertical section, of the structure of FIGS. 4 and 5; and FIG. 7 is a perspective view, of the feed and traverse motor-powered unit, per se, of the installation of FIGS. 4–6.

DESCRIPTION OF PREFERRED EMBODIMENTS

Figure 3:
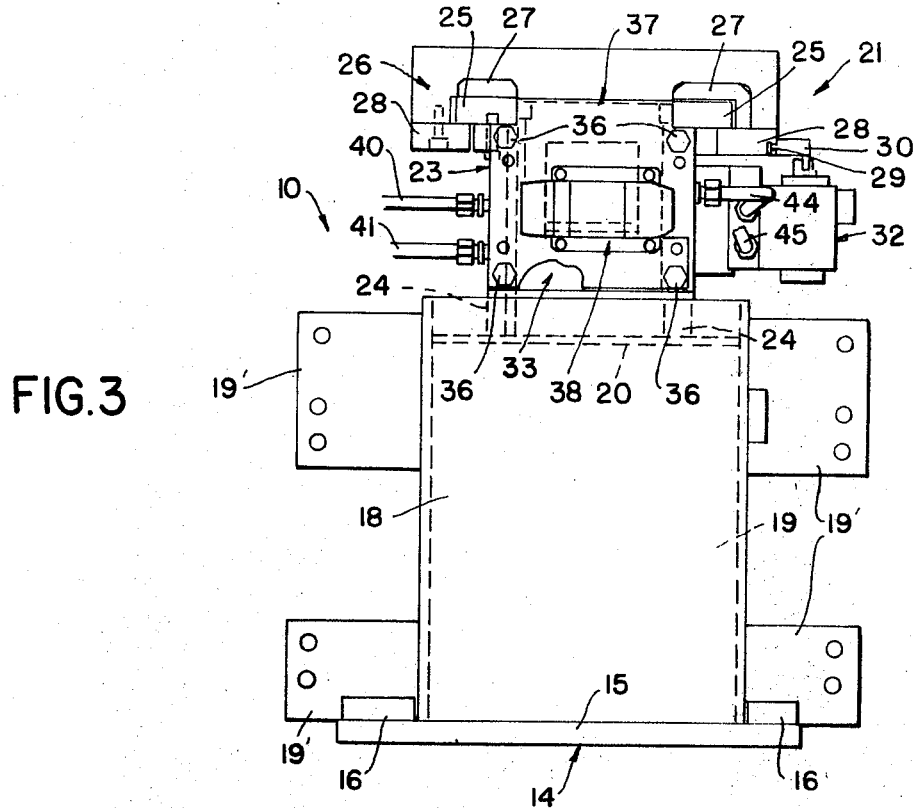
FIG. 3 is a fragmentary view in end elevation, as from the left of FIGS. 1 and 2, showing further features of the mounting or base structure of the invention.
Figure 4:
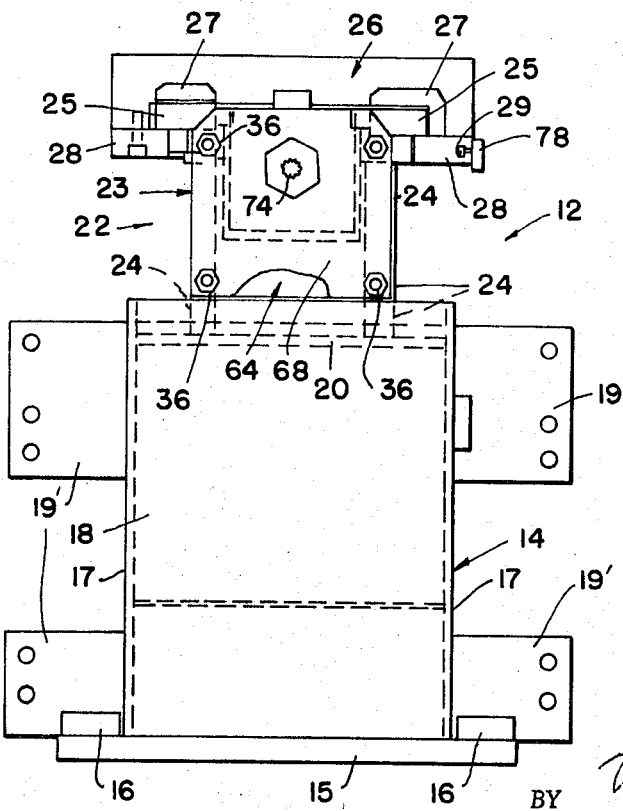
FIG. 4 is a similar end view of an electric motor-powered version in another installation, being characterized by mounting features the same in essence as are shown in FIGS. 1–3, inclusive.

The hydraulically powered embodiment 10 of the invention is illustrated in FIGS. 1, 2 and 3, and has in common with the electric motor-powered version 12, appearing in FIGS. 4–7 inclusive, a rigid and strong base structure, in each case designated generally by the reference numeral 14. This comprises a massive horizontal and rectangular floor plate 15 equipped with pads or bosses 16 at which it may be downwardly bolted to a floor. Structure 14 has parallel upright side panels or plates 17 and an upright rectangular end plate 18 at the left of the structure, as viewed, for example, in FIGS. 2 and 6.

An opposite end wall 19 of the base structure 14 provides heavy duty, laterally extending flanges 19', at which the base structure may be bolted to any appropriate rigid associated structure. An example would be an indexing type conveyor by which palletized workpieces are progressively shifted along a work path which the way, platen or saddle assembly faces from a side.

A top horizontal plate 20 of base structure 14 is equipped with suitable provisions by which either the hydraulic platen or saddle assembly per se, generally designated 21 in FIGS. 1, 2 and 3, or the electric motor-powered assembly per se, generally designated 22 in FIGS. 4–7, may be rigidly but removably attached to the base structure 14. The plate parts of structure 14 are strongly welded to one another; and the height, with and longitudinal extent of the structure may be varied in accordance with the needs of the particular system involved.

The hydraulic saddle assembly or unit of system 12 and the electric motor-powered saddle version 22 of system 14 both include a horizontally elongated, box-like housing 23 which encases the respective power cylinder or feed and traverse screw units of assemblies 21 and 22. Housing 23 is defined by a pair of relatively massive, parallel and upright side plates 24, each of which has rigidly fixed thereto at the top thereof one of a pair of elongated and parallel, horizontal guide plates or ways 25 of rectangular cross section. These horizontally slidably support an elongated tool supporting platen or saddle 26, also of a rectangular cross section; and the saddle is equipped at its ends with wiper devices 27 to engage the ways 25 in the sliding action of platen or saddle 26 to keep them free of chips and foreign matter in general. Elongated supplemental restraining and guide members 28 are bolted from beneath to saddle 26 along the sides of the latter, and one of these members 28 may be grooved at 29 to receive adjustable tappet or like means.

For example, in the hydraulic power embodiment 21 this means may comprise a number of tappets 30 engageable with the operator stem 31 (FIG. 1) of a liquid flow control and decelerating or timing valve unit mounted to a housing wall 24, being generally designated 32 in FIGS. 1, 2 and 3. This unit governs the speed of the traverse-feed-return strokes of the platen or saddle 26, and it may be of the type illustrated and described in the patent to Zajac identified above. As will be described, the external and internal hydraulic conduitry of cylinder unit 21 is operatively connected to valve unit 32; however structural features of the latter naturally form no part of the present invention.

In respect to the motor-powered mechanical feed screw assembly of FIGS. 4–7, the restraint and guide member 28 will adjustably carry tappet or like elements governing limit switches, as later mentioned.

In the case of the hydraulic embodiment 10 of FIGS. 1, 2, and 3, the walls 24 of the cylinder housing structure 23 are spanned (left-hand end in FIGS. 1 and 2) by a rectangular adapter plate or block 33 bolted to the ends of those walls; and pursuant to the invention the walls 24 have provision to not only receive the end block 33 adapting the housing 23 for association with an hydraulic unit 21, but also capable of compatibly receiving a different design of end block, later described, to accommodate the electric motor-powered saddle unit or assembly 22. Appropriate tapping patterns for this purpose will suggest themselves to those of ordinary skill in the art. The adapter blocks may also have provision for rigidly but removably securing them to the top plate 20 of base structure 14, if this is desired.

Again referring to the hydraulic embodiment 21, the adapter block 33 threadedly receives a number of machine bolts 36, shown as four in number, by which it has removably mounted to its rear or outer side a flow distributing manifold 37 of rectangular block-like outline, to the rear or left hand side of which in turn (FIGS. 2 and 3) there is appropriately mounted a conventional solenoid-operated four-way reversing valve 38.

Valve 38, per se, constitutes no part of the present invention. It is however, a pilot-operated directional valve incorporating a spring centered valve plunger, and may be of the type offered by Racine, is., under the designation OD4–BSHS–*06S. Valve unit 38 has its flow reversing provisions appropriately connected to internal passaging (not shown) of the manifold 37, being mounted to the latter in "piggy-back" fashion, just as the manifold mounts to adapter plate 33.

The manifold is supplied with hydraulic liquid under pressure through external supply and return lines 40, 41 connected to suitable pump means (not shown); and the manifold has a discharge passage which communicates directly through a central pressure port 42 in adapter plate 33. Port 42 opens directly to the end of an elongated hydraulic cylinder 43 (FIG. 1) which is in sealed relation to and closed by the inner side of plate 33.

External hydraulic cylinder supply and return lines 44, 45 communicate manifold 37 with the platen speed controlling valve unit 32; and a U-shaped connector 46 (FIGS. 1 and 2) associated with valve 32 connects the latter, as through a nipple 47, with an appropriate manifold 48 at the end of hydraulic cylinder 43 opposite the manifold 37. Thus, under the control of the end-mounted, solenoid operated directional valve 38 and the side-mounted regulating valve unit 32, the strokes of an elongated plunger 50, powered in cylinder 43, may be appropriately timed as to speed in feed, traverse and return phases of operation of the platen or saddle 26. To complete the connection, saddle 26 carries a downwardly extending yoke 52, to which the right hand end of plunger 50 is fixedly secured. The movement thus transmitted is end-limited by a plunger extension 53 engageable with an adjustable stop 54 on end wall 19 of base structure 14.

As best illustrated in FIG. 6, in the case of electric motor-powered screw-type embodiment 22 of the invention, the platen 21 is directly actuated through the agency of a horizontal, elongated drive screw 56, which extends through and threadedly engages a block 57 bolted to the underside of platen 26. For this purpose the block 57 has an internally threaded sleeve 58 fixedly secured to one end thereof (left hand as viewed in FIG. 6); and the sleeve 58 has mating threaded engagement with the screw. The free end of screw 56 may be piloted or threadedly received in a bore 59 at the opposite end of block 57; and an electric motor-powered rotation of screw 56 occasions a longitudinal sliding movement of platen 56 in transverse and feed phases, i.e., from the position illustrated in solid line in FIG. 6 to the dotted line position, and reversely in the return phase. At its extreme fed-in position the motion of the platen is stopped by the engagement of a bumper part 60 on its block 57 with an end stop 61 adjustably threaded in an upright base member 62 rigid on the machine mounting structure 14.

The special adapter plate or block of the screw housing structure 23 of the unit 22 is designated by the reference numeral 64. Like the adapter block 33, it is rectangular in outline, and abuts endwardly against a rugged bearing support 65 disposed between the housing walls 24 and suitably secured rigidly thereto. Adapter 64 is recessed at 66 to accommodate a special bearing block 68 presenting an axially elongated integral sleeve 69; and this sleeve fixedly receives a tapered roller type bearing 70. The inner race of the bearing is carried on a reduced diameter extension 71 of drive screw 56, thus providing an anti-friction journal for the screw 56, the latter being otherwise piloted by the platen or saddle block 57.

Adapter plate 64 is, like the adapter 33, provided with appropriate bolt means to mount the same at an end of a housing 23 of common design, such as accommodates the hydraulic cylinder 43 of the first embodiment and the screw assembly 56, 57 of the second; and it is contemplated that a speed reducer gear assembly 72 of the planetary type (such as is designated 17 in the Farmer application identified above) be rigidly secured to the outside of the bearing block 68. This may be accomplished by using machine bolts 36 in the same arrangement or pattern (FIG. 4) as is utilized in the mounting of the manifold 37 and adapter plate 33 (FIG. 3) of the equipment of the first embodiment. The reducer unit 72 may be attached to adapter 64 at a flange 73 of the unit, the bolts 36 passing through this flange and a portion of the bearing mount 69 and threading into adapter plate 64. Screw extension 71 has a splined end 74 at which a variable speed traverse and feed drive is imparted to screw 56 through reducer assembly 72.

As shown in FIG. 7, the power input to reducer derives from electrical feed and traverse motors 76, 77, respectively, being transmitted through planetary gear means of unit 72 to screw 56. Such torque transmission means are not shown, but are described in detail in the above-identified Farmer application. As previously indicated, the elongated restraint plate 28 at one side of machine tool saddle 26 carries tappets 78 adjustably mounted in the groove 29 of the plate, these tappets being engageable with stroke control and timing limit switches 79 mounted to a side wall 24 of the screw-encasing housing 23. A conduit 80 for electrical leads extends from switch 79 to appropriate electrical connections (not shown) with the circuitry of embodiment 12. Details of such arrangements constitute no part of the present invention, and will be obvious to those of ordinary skill in the art.

What is claimed is:

1. A structure standardized to slidingly support machine tool-carrying saddles or like mounts which are selectively powered by different actuators for sliding action of the mount on the structure; said structure comprising housing or like means adapted to receive either actuator, by which means said mount is slidably supported, said means optionally carrying in fixed relation thereto an adapter of one design or another, which adapter has means to conect it in a similar way to said housing or like means to receive one or another of said different actuators.

2. A structure standardized to slidingly support machine tool-carrying saddles or like mounts which are selectively powered by fluid pressure or electrically energized actuators for sliding action of the mount on the structure; said structure comprising housing or like means adapted to receive either actuator, by which means said mount is slidably supported, said means optionally carrying in fixed relation thereto an adapter of one design or another, which adapter has means to connect it in a similar way to said housing or like means to receive the fluid pressure energized or the electrically energized actuator.

3. The structure of claim 1, in which said housing or like means has provision to selectively support different control units, at least one of which is operated by the tool-carrying mount as the latter is powered by one or the other of said actutators.

4. The structure of claim 2, in which said housing or like means has provision to selectively support fluid pressure or electrical control units, at least one of which is operated by the tool-carrying mount as the latter is powered by one or the other of said actuators.

5. The structure of claim 2, in which said adapter is at an end of a cylinder unit constituting part of a fluid pressure actuator and operatively connected to the tool-carrying mount to move the latter.

6. The structure of claim 3, in which said adapter is at an end of a cylinder unit constituting part of a fluid pressure actuator and operatively connected to the tool-carrying mount to move the latter.

7. The structure of claim 4, in which said adapter is at an end of a cylinder unit constituting part of a fluid pressure actuator and operatively connected to the tool-carrying mount to move the latter.

8. The structure of claim 2, in which said adapter internally receives a motor-powered rotary member constituting part of an electrically energized actuator and operatively connected to the tool-carrying mount to move the latter.

9. The structure of claim 3, in which said adapter internally receives a motor-powered rotary member constituting part of an electrically energized actuator and operatively connected to the tool-carrying mount to move the latter.

10. The structure of claim 2, in which said adapter internally receives a motor-powered rotary member constituting part of an electrically energized actuator and operatively connected to the tool-carrying mount to move the latter.

11. The structure of claim 4, in which said one of said control units is a valve unit controlling rate of movement of the mount, the other control unit being another valve unit mounted to said adapter and controlling the direction of movement of the mount.

12. The structure of claim 7, in which said one of said control units is a valve unit controlling rate of movement of the mount, the other control unit being another valve unit mounted to said adapter at said end of said cylinder and controlling the direction of movement of the mount.

13. The structure of claim 9, in which said one control unit is an electrical switch, said actuator being electrically powered through circuitry including said switch.

14. The structure of claim 10, in which said one control unit is an electrical switch, said actuator being electrically powered through circuitry including said switch, said mount carrying means to operate said switch in the movement of the mount.

References Cited

UNITED STATES PATENTS 2,367,492  1/1945  Fickett et al. _____ 60—6 XR
2,660,026  11/1953 Geyer _____ 60—6
2,949,742  8/1960  Williamson et al. ____ 60—6 XR EDGAR W. GEOGHEGAN, Primary Examiner U.S. Cl. X.R.
60—52; 74—89.14

UNITED STATES PATENT OFFICE
CERTIFICATE OF CORRECTION

Patent No. 3,521,444         Dated   July 21, 1970

Inventor(s)   Wilbur R. Gerchow and Michael Zajac

It is certified that error appears in the above-identified patent and that said Letters Patent are hereby corrected as shown below:

Column 4:

Line 1: After the word "Racine" delete the word "Is" and insert the following - - -Hydraulic and Machinery, Inc. of Racine, Wisconsin,- - -

Signed and sealed this 15th day of February 1972.

(SEAL)
Attest:

EDWARD M. FLETCHER, JR.                ROBERT GOTTSCHALK
Attesting Officer                       Commissioner of Patents